(12) United States Patent
Gilbert et al.

(10) Patent No.: US 11,495,249 B1
(45) Date of Patent: Nov. 8, 2022

(54) METHOD AND APPARATUS FOR MAGNETICALLY RECORDING DATA WITH THREE OR MORE STATES PER UNIT OF DATA

(71) Applicant: Seagate Technology LLC, Fremont, CA (US)

(72) Inventors: Ian James Gilbert, Chanhassen, MN (US); Peng Peng, Eden Prairie, MN (US); Todd Michael Lammers, Lafayette, CO (US); Tim Rausch, Farmington, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/227,958

(22) Filed: Apr. 12, 2021

(51) Int. Cl.
  *G11B 5/68* (2006.01)
  *G11B 5/00* (2006.01)
  *G11B 5/012* (2006.01)

(52) U.S. Cl.
  CPC ...... *G11B 5/012* (2013.01); *G11B 2005/0018* (2013.01)

(58) Field of Classification Search
  CPC .... G11B 5/68; G11B 5/09; G11B 6/62; G11B 2005/0018; G11B 2005/0021; G11B 2005/0024; G11B 2005/0034; G11B 5/00
  USPC .................................................. 360/75, 48
  See application file for complete search history.

(56) References Cited

U.S. PATENT DOCUMENTS

| | | |
|---|---|---|
| 3,601,702 A | 8/1971 | Lender |
| 5,621,580 A | 4/1997 | Cruz et al. |
| 6,865,044 B1 | 3/2005 | Albrecht et al. |
| 6,947,235 B2 | 9/2005 | Albrecht et al. |
| 7,974,031 B2 | 7/2011 | Dobin et al. |
| 7,982,994 B1 | 7/2011 | Erden et al. |
| 8,081,542 B1 | 12/2011 | Grobis et al. |
| 8,107,194 B2 | 1/2012 | Jubert |
| 9,601,144 B1 | 3/2017 | Mehta et al. |
| 9,704,552 B2 * | 7/2017 | Kudo .................. G11C 11/161 |
| 9,818,440 B1 * | 11/2017 | Jubert ................... G11B 5/314 |
| 10,311,897 B1 | 6/2019 | Eppler et al. |
| 10,803,896 B1 * | 10/2020 | Mohl ..................... G11B 5/09 |
| 2010/0149676 A1 | 6/2010 | Khizorev et al. |

OTHER PUBLICATIONS

Amos et al., "Multilevel-3D Bit Patterned Magnetic Media with 8 Signal Levels Per Nanocolumn", PLoS One, vol. 7, Issue 7, Jul. 2012, 8 pages.

(Continued)

*Primary Examiner* — Nabil Z Hindi
(74) *Attorney, Agent, or Firm* — Mueting Raasch Group (57) ABSTRACT

Two or more different recording currents are applied to a write coil of a recording head. A first of the two or more currents is a positive current and a second of the two or more currents is a negative current. In response to the application of the two or more different recording currents, a data stream is recorded to regions of a moving continuous magnetic recording medium such that each region has three or more magnetic states. The three or more magnetic states can be read from the continuous magnetic recording medium via a magnetic read transducer to recover the data stream.

18 Claims, 9 Drawing Sheets

(56) References Cited

OTHER PUBLICATIONS

Baltz et al., "Multilevel magnetic media in continuous and patterned films with out-of-plane magnetization", Journal of Magnetism and Magnetic Materials, vols. 290-291, PArt 2, Apr. 2005, pp. 1286-1289.

Greaves et al., "Multiple Layer Microwave-Assisted Magnetic Recording", IEEE Transactions on Magnetics, vol. 53, No. 2, Feb. 2017, pp. 1-10.

Huang et al., "Design of Multilevel Reed-Solomon Codes and Iterative Decoding for Visible Light Communication", IEEE Transactions on Communications, vol. 67, No. 7, Jul. 2019, pp. 4550-4561.

Khizroev et al., "Physics considerations in the design of three-dimensional and multilevel magnetic recording", Journal of Applied Physics, 100, 2006, 14 pages.

\* cited by examiner

METHOD AND APPARATUS FOR MAGNETICALLY RECORDING DATA WITH THREE OR MORE STATES PER UNIT OF DATA

SUMMARY

The present disclosure is directed to a method and apparatus for magnetically recording data with three or more data states. In one embodiment, two or more different recording currents are applied to a write coil of a recording head. A first of the two or more currents is a positive current and a second of the two or more currents is a negative current. In response to the application of the two or more different recording currents, a data stream is recorded to regions of a moving continuous magnetic recording medium such that each region has three or more magnetic states. The three or more magnetic states are read from the continuous magnetic recording medium via a magnetic read transducer to recover the data stream.

In another embodiment, a binary data stream is converted to a data stream having three or more states per unit of data. The data stream is recorded via two or more different recording currents to regions of a moving continuous magnetic recording medium such that each region has three or more magnetic states. Each of the magnetic states corresponds to one of the three or more states per unit of data. The three or more magnetic states can be read from the continuous magnetic recording medium via a magnetic read transducer to recover the data stream. The recovered data stream is then converted to a binary output stream. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., magnetic disks. For example, a hard disk drive (HDD) unit contains one or more magnetic disks that are written to and read from using a magnetic read/write head attached to the end of an arm that is positioned over tracks in the disk. To record data, the read/write head generates magnetic fields using a magnetic coil, the fields being directed to the magnetic disk surface via a write pole. To read data, the read/write head senses changes in magnetic field via a sensor such as a magneto-resistive stack that is held proximate to the moving disk. A disk drive often has multiple heads, one for each disk surface.

A disk drive that uses just the write coil and write pole to record data is sometimes referred to as a conventional magnetic recording (CMR) drive. Modern CMR drives typically employ perpendicular magnetic recording (PMR), in which the magnetic fields are aligned perpendicularly to the disk surface. This allows for higher areal density (AD) compared to schemes where the fields are parallel to the disk surface. Some drives may employ different track writing formats to increase AD, such as shingled magnetic recording (SMR) and interlaced magnetic recording (IMR), in which adjacent tracks are layered upon one another during writing. Other technologies employed to increase AD include heat-assisted magnetic recording (HAMR) and microwave-assisted magnetic recording (MAMR). These technologies use additional components (e.g., laser for HAMR and spin-torque oscillator for MAMR) to affect the size of the recorded hotspot such that smaller bits can be written to the disk compared to a CMR drive.

Whatever technology is used to record data to a magnetic disk, there is a desire to increase AD such that an individual magnetic disk can store ever-larger amounts of data while reducing the cost per unit of data. The advanced recording technologies described above (e.g., SMR, IMR, HAMR, MAMR) try to increase AD by reducing the area in which a unit of data is stored, e.g., a single bit value of zero or one that is stored in a region having a negative or positive magnetic orientation. In embodiments described herein, a data storage device increases AD by increasing the amount of data that can be stored in a given region, e.g., having more than two states per recorded region. The region in which an individual unit of data is stored is referred to as a bit in binary recording, and in this disclosure, a bit is extended such that it may store more than two states. A device that can store n>2 states per region/bit can store up to n/2 times more per unit area than binary storage.

Figure 1:
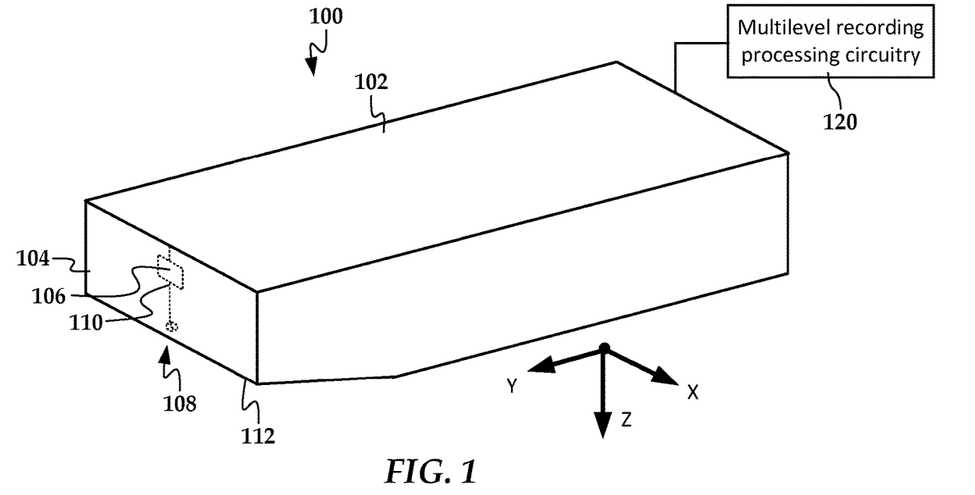
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 may be a CMR head, or may be configured as a HAMR or MAMR device. In the latter case, the head includes additional components that assist the read/write transducer 108 during recording. These components are generally indicated by block 106 and may include a laser diode and a waveguide in a HAMR implementation, or a spin-torque oscillator for a MAMR device.

The writer of the read/write head 100 is configured write to more than two different states to a recording medium, which is referred to herein as multilevel recording or multilevel writing. The two or more states are discrete, in that the number of states are predefined and the physical properties of the states are at known levels or values. The reader of the read/write head 100 is configured to read the two or more states back, which is referred to herein as multilevel reading. Multilevel reading and recording is enabled by processing circuitry 120 that will be discussed in further detail below. Note that the read/write head 100 may be substantially similar to a binary read/write head in some embodiments. In other embodiments, the read/write head may have specific features that improve multilevel read and write performance, such as a specially-tuned read transducer that is sensitive to more than two magnetic states/levels. However, those particular multilevel features of the read/write head 100 are beyond the scope of this disclosure.

Figure 2:
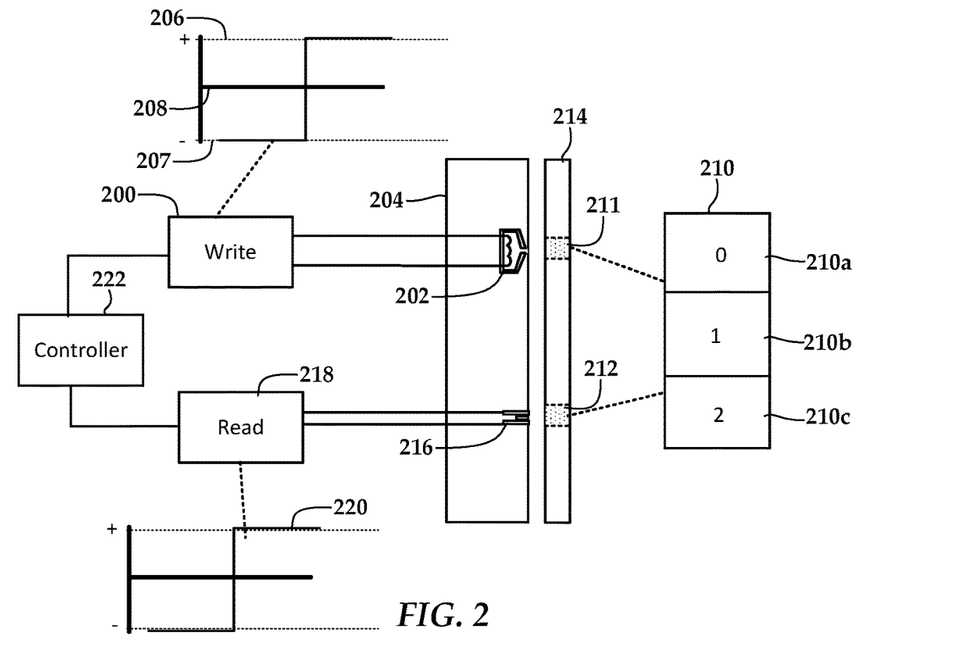
FIG. 2 is diagram schematically representing a data storage device according to an example embodiment.

In FIG. 2, a diagram schematically represents aspects of a data storage device according to an example embodiment. A write circuit 200 applies two or more different recording currents 206, 207 to a write pole 202 of a recording head 204. A first current 206 of the two or more currents is a positive current and a second current 207 of the two or more currents being a negative current. Note that a third current 208 is also shown here, which is a zero or near-zero current.

For purposes of this disclosure, a zero or near zero-current is one that has the intended effect of a zero or neutral field applied to the recording medium, although there may be some small amount of current applied via the circuitry 200 to overcome electrical bias, magnetic hysteresis, etc. As will be described in greater detail below, some embodiments may use only two non-zero currents, and other embodiments may use more than two non-zero currents. Similarly, some embodiments may use no zero or near-zero currents. At least one of the currents (e.g., current 206) will be at or near a maximum positive value, and another of the currents (e.g., current 207) will be at or near a maximum negative value. The magnitudes of the maximum negative and positive currents may be the same or different.

Data 210 is recorded with the write pole to regions 211, 212 of a moving continuous magnetic recording medium 214 such that each region 211, 212 has more than three or more magnetic states corresponding to the two or more recording currents 206, 207. In this example, the states are indicated by ternary values 210*a*-*c* of the data (0, 1, 2), although other representations of the data 210 may be used (e.g., −1, 0, 1). A read transducer 216 reads the three or more magnetic states 210*a*-*c* from the continuous magnetic recording medium 214 via a magnetic read transducer 216 to recover the data, as indicated by read circuitry 218 which extracts a data signal 220 which is processed by a controller 222 to recover the stored data.

From a physics standpoint, one challenge in multilevel magnetic recording is how to define different levels of magnetization for a single region in the magnetic recording medium. Several possible schemes for achieving this are described below, each of which is applicable to some combination of PMR, MAMR, and HAMR.

In one embodiment, the magnetization of the magnetic recording medium is controlled only by the electrical signal in the coils surrounding the write pole, e.g., PMR. Two levels may be defined by applying the maximum positive or negative current. The maximum current limits may be defined based on heat, electromigration, or other damage to the magnetic writer or by the limit of the preamplifier used to drive the magnetic writer. Other levels associated with intermediate states may be defined by intermediate current values between these two limits, including a zero or near-zero current.

Figure 3:
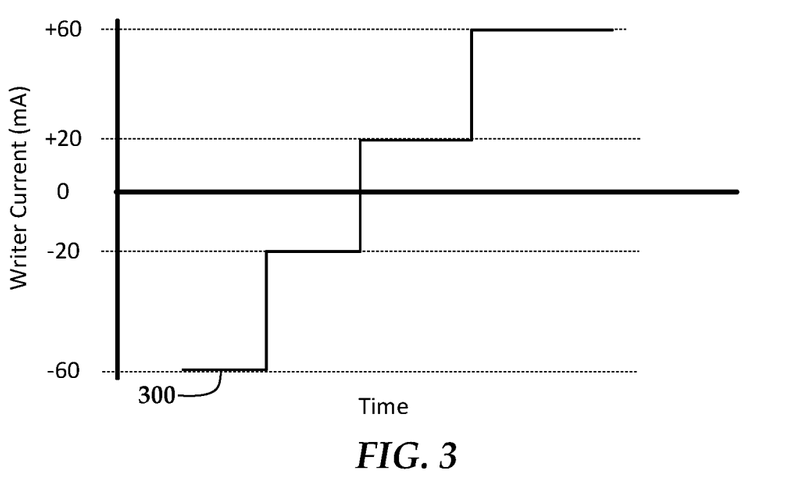
FIGS. 3 and 4 are graphs showing data storage signals according to example embodiments.
Figure 4:
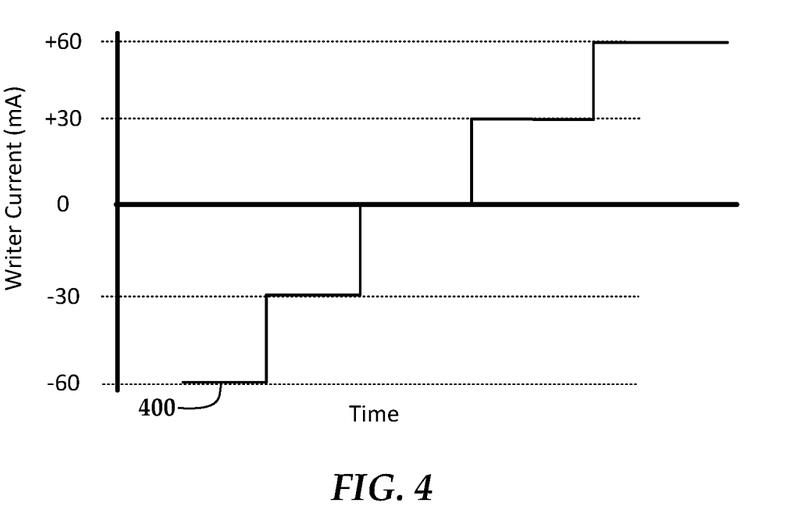

A non-limiting example would be to define three possible states: one state defined by a −60 mA writer current, another by a +60 mA writer current, and a third by applying no current to the writer (0 mA, or a small biasing current, e.g., <3 mA positive or negative). A similar scheme is represented by signal levels 206-208 in FIG. 3. Another non-limiting example would be to define four possible states using −60 mA, −20 mA, +20 mA, and +60 mA writer currents, respectively. Signal 300 in FIG. 3 is shown using this scheme. Yet another non-limiting example would be to define five possible states using −60 mA, −30 mA, 0 mA, +30 mA, and +60 mA writer currents. Signal 400 in FIG. 4 is shown using this scheme.

Figure 5:
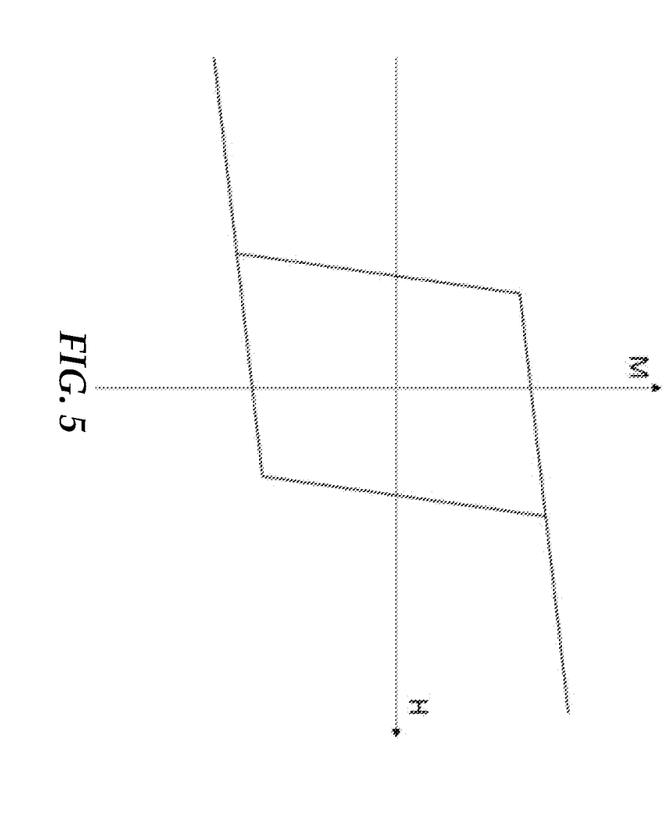
FIGS. 5 and 6 are hysteresis loop diagrams showing performance of a recording medium according to example embodiments.

Note that while the preceding examples include equally-spaced writer currents corresponding to the different states to be encoded, depending on the detailed properties of the magnetic write pole, coils, reader, media stack, etc., equally-spaced levels may not provide the optimal SNR. For example, for a magnetic recording medium with the hysteresis loop shown in FIG. 5, a four-level recording scheme may achieve better results using magnetic writer currents of −60 mA, −15 mA, +15 mA and +60 mA, respectively, to record the four levels.

Figure 6:
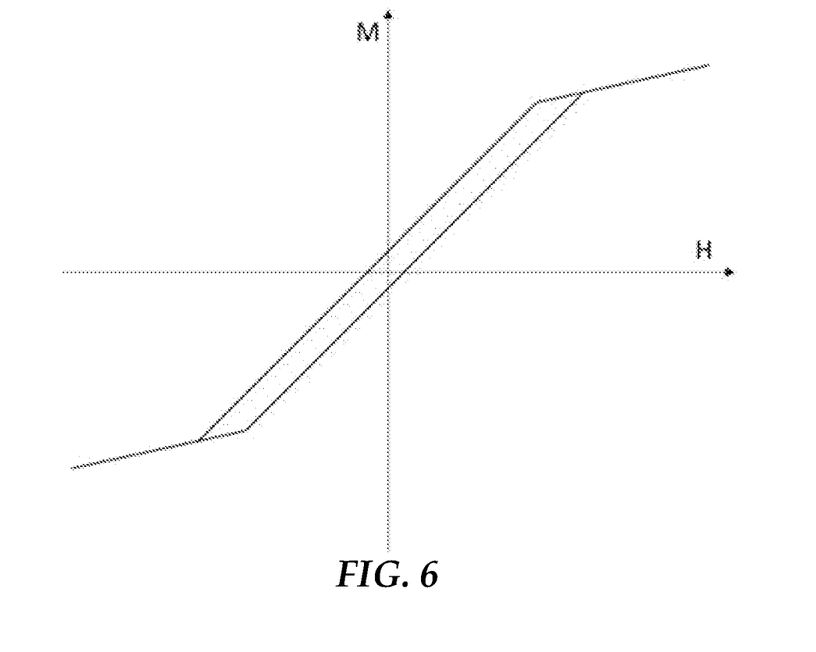

There are several possible ways of generating the multiple levels of current to the magnetic writer. A multiple-level analog writer driver may be implemented in the preamplifier. Alternately, the output of several different drivers generating two-level (digital) signals may be combined by additional circuitry. Note also that while for binary magnetic recording, a magnetic recording pole with a relatively square hysteresis loop with low coercivity may be optimal. For this embodiment of multilevel magnetic recording, a narrow, slanted hysteresis loop may be used, as seen in FIG. 6.

Figure 7:
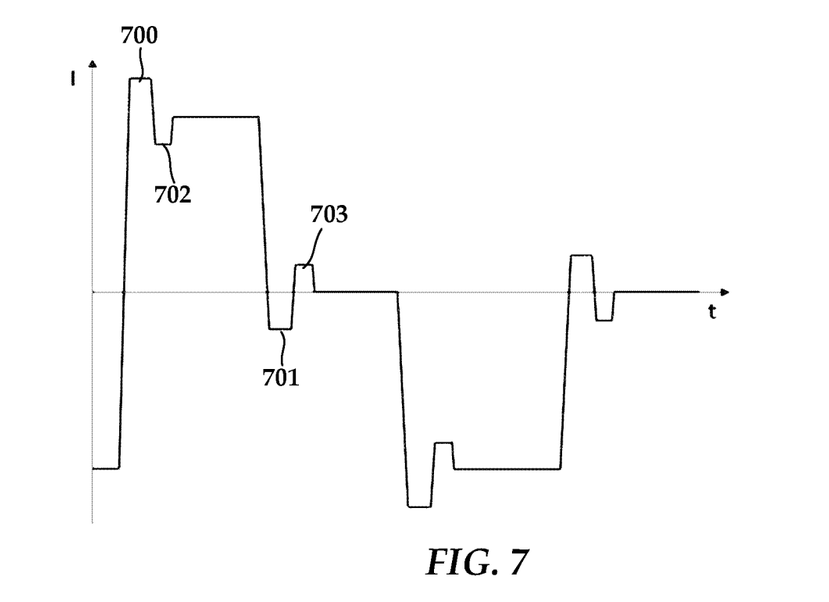
FIGS. 7, 8, and 9 are graphs showing recording signal features according to example embodiments.

In a second embodiment, an apparatus with the features of the first embodiment incorporates additional features in the magnetic writer signal. Overshoot pulses such as those used in PMR and HAMR to improve the transition quality for conventional binary data may be applied to transitions between some or all combinations of levels in multilevel recording. Undershoot pulses can additionally be used to control the magnetic state of the write pole. For example, in the case of three-level recording, an undershoot pulse can be used to ensure the write pole is demagnetized while zero level marks are being recorded. In FIG. 7, a graph illustrates some examples of overshoot pulses (e.g., 700, 701) and undershoot pulses (e.g., 702, 703) in a recording waveform.

A third embodiment utilizes features that reliably record a zero or near-zero signal to the recording medium. For example, in a magnetic write pole design optimized for the recording of binary data (but to some extent for any magnetic write pole), it may be difficult to consistently demagnetize the pole to the correct level, e.g., for the recording of the zero state when an odd number of levels are to be recorded. This embodiment addresses this difficulty by recording intermediate levels using an AC magnetic write signal with a frequency higher than the data rate.

Figure 8:
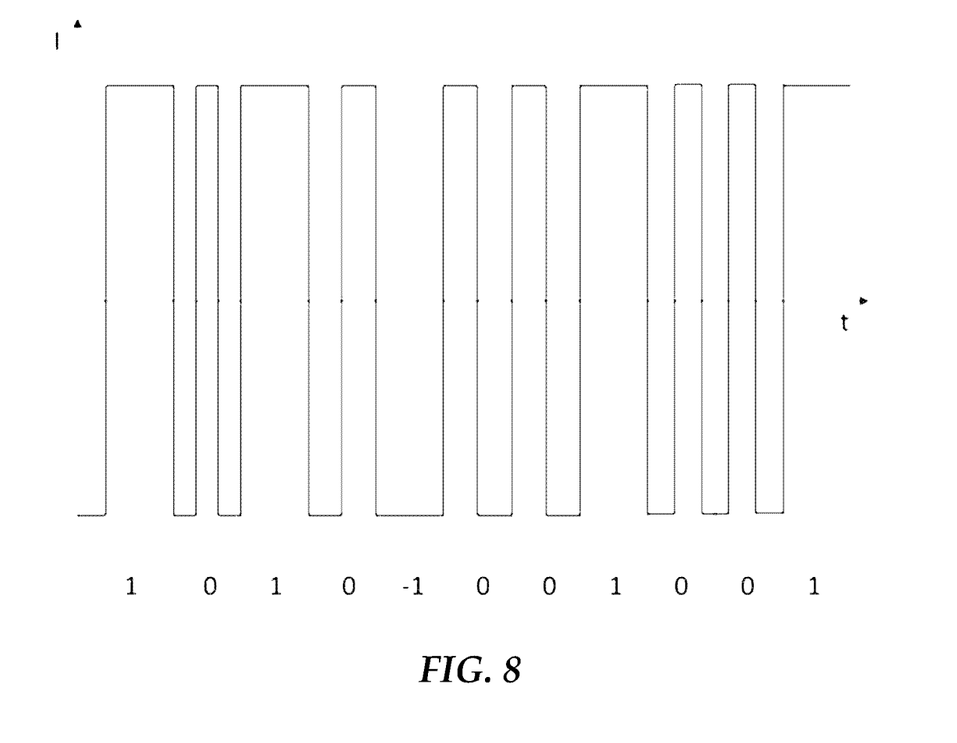

In one non-limiting example, information is recorded in three states corresponding to two current levels. An exemplary waveform for the magnetic writer signal used in this example is shown in the graph of FIG. 8. For two states (1 and −1), a constant magnetic write current of, e.g., ±60 mA is used (perhaps also with an overshoot and/or undershoot pulse). For the third state, which is intermediate level (0), the writer signal is a sine or square wave with an amplitude of 60 mA. It should be noted that in order to avoid unwanted transition shifts that would degrade the bit error rate, the frequency of the AC erase signal used to define the zero state may be chosen such that the polarity of the AC erase signal at the beginning of a zero-level mark matches the polarity of the previously-written mark, and similarly the polarity of the AC erase signal at the end of a zero-level mark matches the polarity of the next mark to be written.

Figure 9:
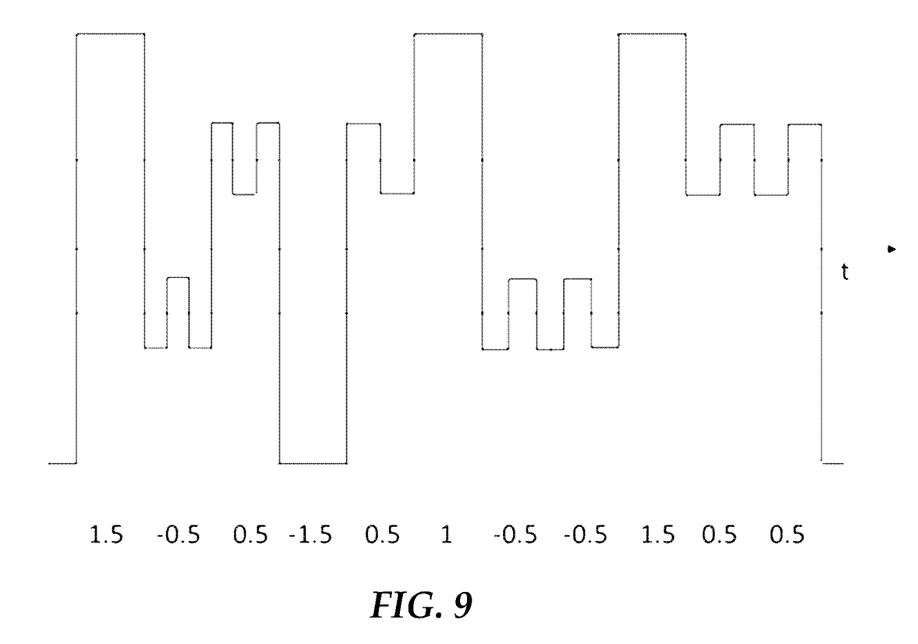

Note that the use of AC erase signals need not be restricted to the zero state (e.g., zero magnetic field) of a recording scheme with an odd number of levels. In another example shown in FIG. 9, a four-level scheme is used, in which two states (−1.5, 1.5) are defined using a DC ±60 mA writer current (perhaps also with an overshoot and/or undershoot pulse), and two intermediate states (−0.5, 0.5) are defined using an AC sine or square wave of amplitude 10 mA superimposed on DC ±20 mA writer currents.

Figure 10:
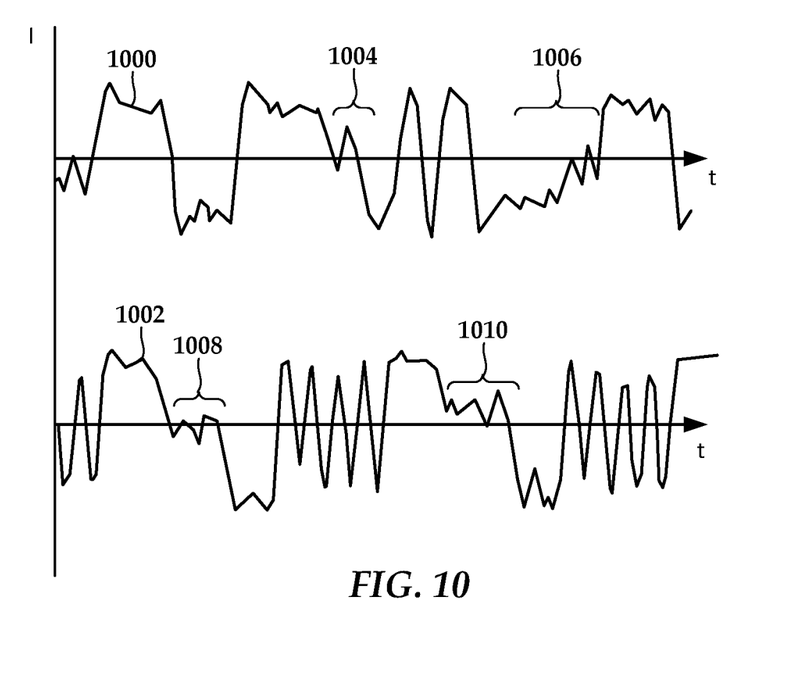
FIG. 10 is a graph showing experimental read signals in a data storage device according to example embodiments.

In FIG. 10, graphs show an experimental read back signals for a three-state pattern recorded on HAMR media using different schemes. The data represented in trace 1000 was recorded using an overshoot/undershoot scheme as in FIG. 7, and the data represented in trace 1002 used a high-frequency erase scheme as shown in FIG. 8. Note that traces 1000, 1002 are arbitrary waveforms samples and not meant to represent the same recorded data. Note that compared to trace 1000, the zero state is better defined via a high-frequency AC erase in trace 1002, e.g., in regions 1004 and 1006 for the former versus regions 1008 and 1010 for the latter.

The embodiments described above allow a recording device to use of multiple (greater than two) levels of magnetic writer current to record multiple states of a magnetic field in the magnetic recording medium. In PMR, the quality of the recorded signal may be enhanced by first alternate current (AC) erasing the track to be written, as the overwrite properties of intermediate states may not be as good as states defined with maximum writer current of either polarity. For example, a two pass recording may be used in which the same head (or a different head, such as in a multiple actuator drive) first erases tracks before a recording pass. In other embodiments, a second write coil on the same head or same head-gimbal assembly may be located leading the recording head to erase tracks as they are written. This can be used instead of embodiments such as shown in FIG. 8, where the erase signal is included in the recording signal.

In MAMR and HAMR, the energy assist mechanism may be sufficient to remove previously-recorded data without a dedicated AC erase prior to writing or during writing. Generally, this is due to the heat source (HAMR) or microwave source (MAMR) neutralizing the magnetic state of the recording media at a zero current or near-zero current state.

The media itself can be tuned in order to better support multiple levels per bit. There are a number of possible examples for different recording technologies. In PMR, multiple magnetic layers with different coercivity may be used so that layers with low coercivity are recorded by some or all levels of write current, whereas levels with high coercivity are only recorded by a large amplitude write current. In MAMR, the media may be tuned such that, combined with the microwave assist, the slope of the M-H hysteresis loop is shallow so that multiple levels can be recorded in one write with a multilevel signal applied to the writer. The media may include multiple uncoupled, independent layers that may be separately addressed during different writes. In HAMR, multiple magnetic layers with similar Curie temperatures but different coercivities may be used such that in a single write with a single constant laser power, multiple levels may be recorded using a multilevel signal applied to the magnetic writer.

The multilevel data may be read from the media using a reader, e.g., a giant magnetoresistive (GMR) or tunneling magnetoresistive (TMR) reader, in a manner similar to the reading of conventional binary data recorded in a hard disk drive. The trace 1000 in FIG. 10 shows the experimental read back signal from three-level data recorded on a HAMR disk using magnetic write currents of −55 mA, 0 mA, and +55 mA to define the three states. Note that the "0" level may not be well-defined in this case, perhaps due to the remnant field of the pole present even when then magnetic write current is set to zero, and this may be tuned by applying a small current during recording of the zero field states.

The magnetic properties of the reader may be adjusted for reading multilevel data, as well. For example, it may be advantageous to provide a reader with a shallower electrical response to external field, which would provide greater separation between the voltage levels in the read signal associated with the different magnetization levels recorded in the media. New methods may also be developed to decode the recorded data from the read back signal. One method is to use a threshold detector, where for N levels per section of media, there are N−1 levels defined as the thresholds separating these levels in the read back signal, and information is decoded by comparing the read back voltage at a given point to this set of thresholds.

More powerful decoding techniques may perform better for multilevel data, such as those adapted from partial response maximum likelihood (PRML), low density parity check (LDPC), Reed-Solomon codes, Viterbi algorithms, etc. Note that since ordinary user data may originally be in binary format, additional processing may be used both prior to writing and after reading to convert the binary user data to the correct multilevel format for writing and then back to binary format after reading.

Figure 11:
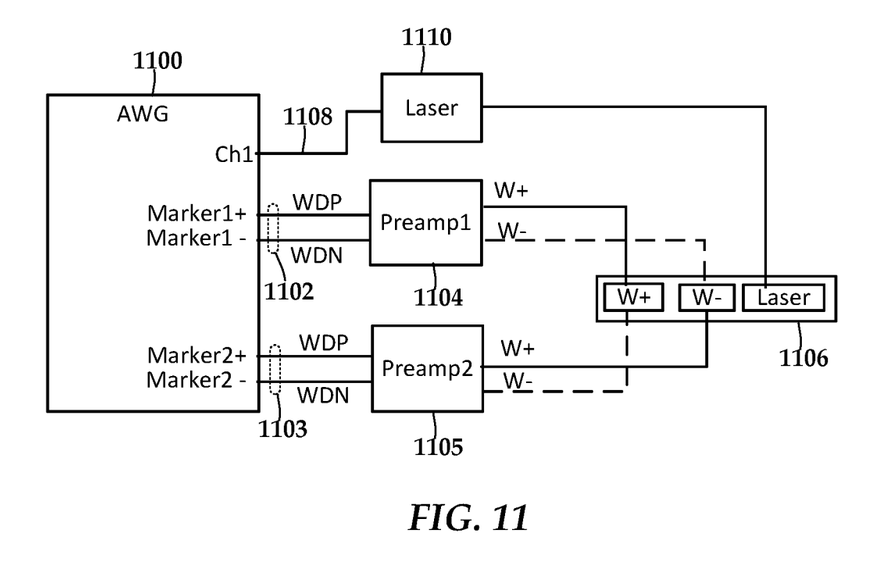
FIGS. 11-14 are diagrams of recording signal circuits according to example embodiments.

An analog writer driver may be implemented in the preamplifier. Alternately, the output of several different drivers generating two-level (digital) signals may be combined by additional circuitry. In FIG. 11, a block diagram shows circuitry to generate a multi-level writer waveform along with a laser signal according to an example embodiment. In this example, two streams 1102, 1103 of writer data are generated by marker outputs from an arbitrary waveform generator (AWG) 1100.

The write data streams 1102, 1103 are passed to two separate preamp integrated circuits (ICs) 1104, 1105, which output signals to an interface 1106 of a recording head. One preamp 1104 is connected to the writer coil of a recording head using the same polarity, while the other preamp 1105 is connected with reversed polarity. This connection scheme can form the desired writer waveform using the existing preamps in drive. A laser signal 1108 can also be optionally generated from the AWG's analog output for HAMR recording. The signal 1108 is amplified via a laser section 1110 which outputs a signal to the laser pad of the recording head interface 1106. Note that in this and the following figures, a driver section for a spin-torque oscillator may be substituted for the illustrated laser section, such that these circuits can also be used for MAMR storage devices in addition to HAMR.

Figure 12:
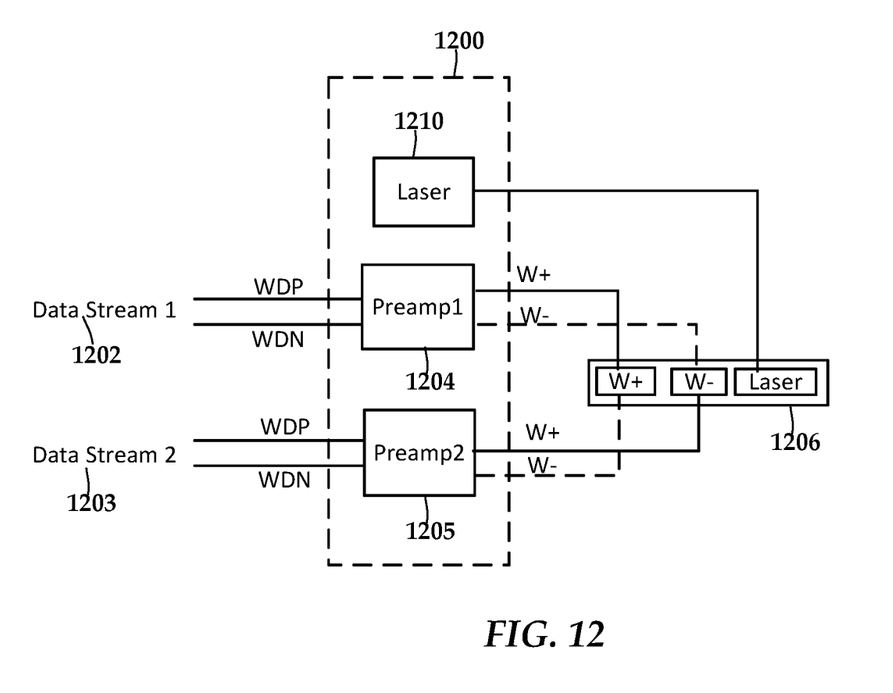

In FIG. 12, a block diagram shows circuitry to generate a multi-level writer waveform along with a laser signal according to another example embodiment. In this example, two streams 1202, 1203 of writer data are provided to a preamplifier 1200, e.g., from an encoder circuit. The write data streams 1202, 1203 are passed to two separate preamp sections 1204, 1205, which output signals to an interface 1206 of a recording head. The sections 1204, 1205 may be part of a single circuit package or may be separate circuit chips/packages. One preamp section 1204 is connected to the writer coil of a recording head using the same polarity, while the other preamp section 1205 is connected with reversed polarity. This connection scheme can form the desired writer waveform using the existing preamps in drive. The preamplifier 1200 may also include a laser amplifier 1210 for HAMR recording, which outputs a signal to a laser pad of the recording head interface 1206.

Figure 13:
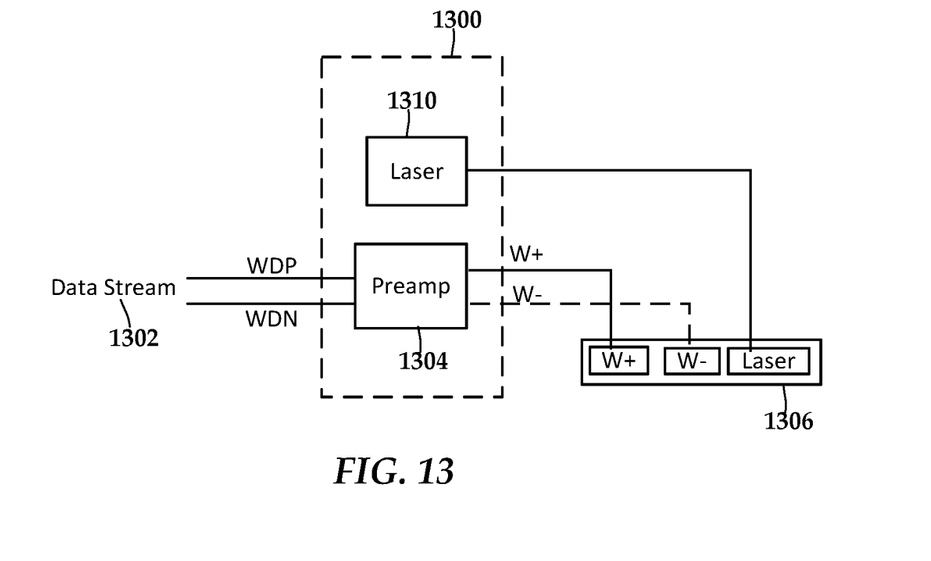

In FIG. 13, a block diagram shows circuitry to generate a multi-level writer waveform along with a laser signal according to another example embodiment. In this example, a single stream 1302 of writer data is provided to a writer section 1304 of a preamplifier 1300. The writer section 1304 generates a multi-level writer waveform (e.g., three or more discrete analog or digital levels) that is input to a write coil via an interface 1306 of a recording head. The data stream 1302 in this example may be multiple level, although the preamplifier 1300 may further condition the multi-level output waveform, e.g., adding overshoot and undershoot, adding erasure signal for certain values, etc. The preamplifier 1300 may also include a laser section 1310 which outputs a signal to a laser pad of the recording head interface 1306.

Figure 14:
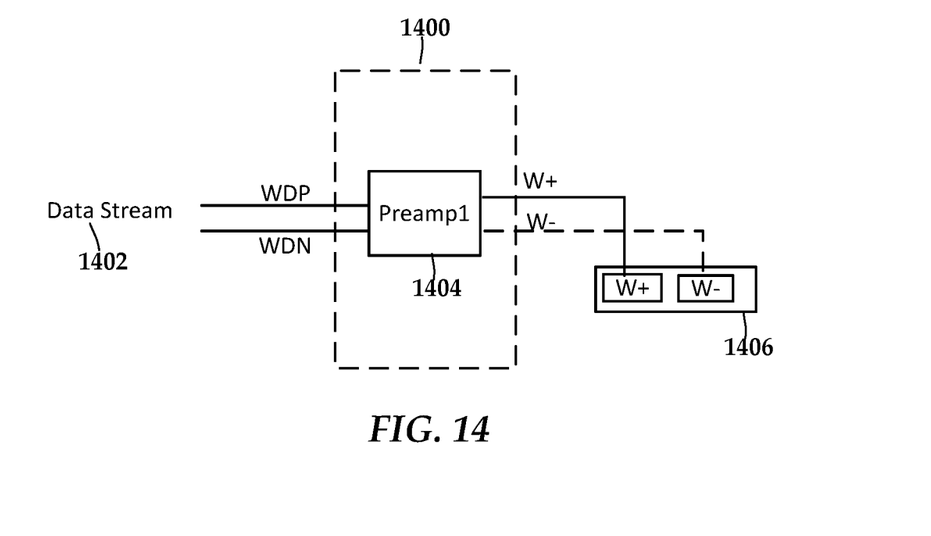

In FIG. 14, a block diagram shows circuitry to generate a multi-level writer waveform without a laser according to an example embodiment. In this example, a single stream 1402 of writer data is provided to a writer section 1404 of a preamplifier 1400. The writer section 1404 generates a multi-level writer waveform that is input to a write coil via an interface 1406 of a recording head. The data stream 1402 in this example may be multiple level, although the preamplifier 1400 may further condition the multi-level output waveform, e.g., adding overshoot and undershoot, adding erasure signal for certain values, etc. The preamplifier 1400 in this example does not include a laser section, and so can be used with PMR data storage. In such an arrangement, a high-frequency AC erase can be used to generate a zero state as described above.

Figure 15:
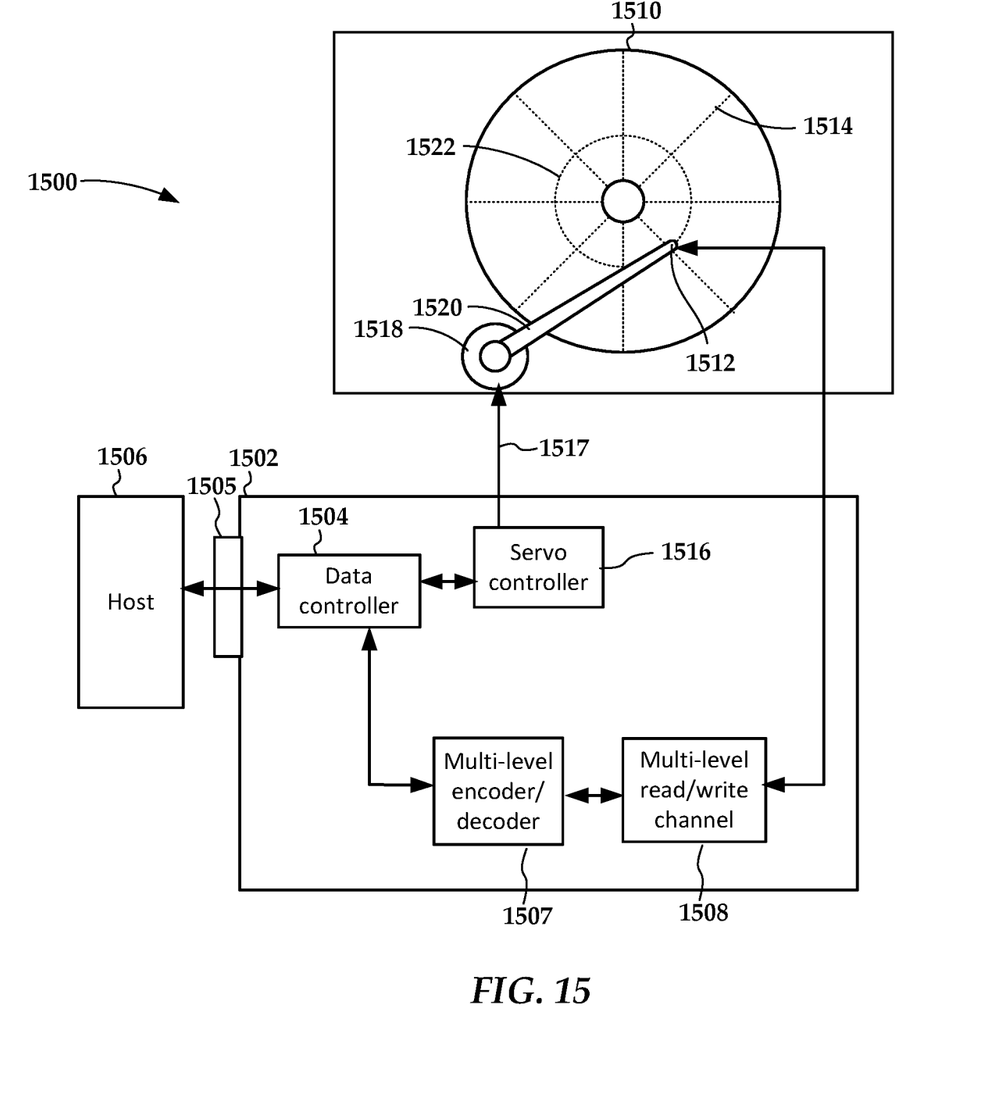
FIG. 15 is a block diagram of an apparatus according to an example embodiment.

In FIG. 15, a block diagram illustrates a data storage device 1500 according to an example embodiment. Control logic circuit 1502 of the device 1500 includes a system controller 1504 that processes read and write commands and associated data from a host device 1506, which is coupled via a host interface 1505. The host device 1506 may include any electronic device that can be communicatively coupled to store and retrieve data from a data storage device, e.g., a computer, storage controller card, etc. The system controller 1504 is coupled to a read/write channel 1508 that reads from and writes to a surface of a magnetic disk 1510. The magnetic disk 1510 is a continuous magnetic recording medium, e.g., not using manufactured patterns or structures such as in patterned media.

The read/write channel 1508 generally converts data between the digital signals processed by the controller 1504 and the analog signals conducted through one or more read/write heads 1512 during read operations. To facilitate the read operations, the read/write channel 1508 may include analog and digital circuitry such as preamplifiers, filters, decoders, digital-to-analog converters, timing-correction units, etc. The read/write channel 1508 also provides servo data read from servo wedges 1514 on the magnetic disk 1510 to a servo controller 1516. The servo controller 1516 uses these signals to provide a voice coil motor control signal 1517 to a VCM 1518. The VCM 1518 rotates an arm 1520 upon which the read/write heads 1512 are mounted in response to the voice coil motor control signal 1517.

Data within the servo wedges 1514 is used to detect the location of a read/write head 1512 relative to the magnetic disk 1510. The servo controller 1516 uses servo data to move a read/write head 1512 to an addressed track 1522 and block on the magnetic disk 1510 in response to the read/write commands (seek mode). While data is being written to and/or read from the disk 1510, the servo data is also used to maintain the read/write head 1512 aligned with the track 1522 (track following mode).

The read/write channel 1508 is a multiple level recording state channel that applies two or more different recording currents to a write coil of the head 1512 to record data to regions/bits of the disk 1510 such that each region/bit has three or more magnetic states. The recording currents include a negative current, a positive current, and may include one or more currents in between the positive and negative currents, to include a zero or near-zero current. The head 1512 also includes a read transducer, and the read/write channel 1508 facilitates reading the three or more magnetic states from the disk 1510 to recover the recorded data.

Because the host data will generally be binary, the data storage device 1500 includes a multi-level encoder/decoder 1507 that translates between binary coding formats used by the data controller 1504 and host 1506. Generally, the encoder/decoder 1507 will translate between binary data streams and multi-level data stream, which stored data in three or more states per unit (e.g., bit) of data. Note that the servo controller 1516 may also utilize multi-level recording and reading for the servo wedges 1514, and therefore servo data may also be processed though the multi-level recording components 1507, 1508.

Figure 16:
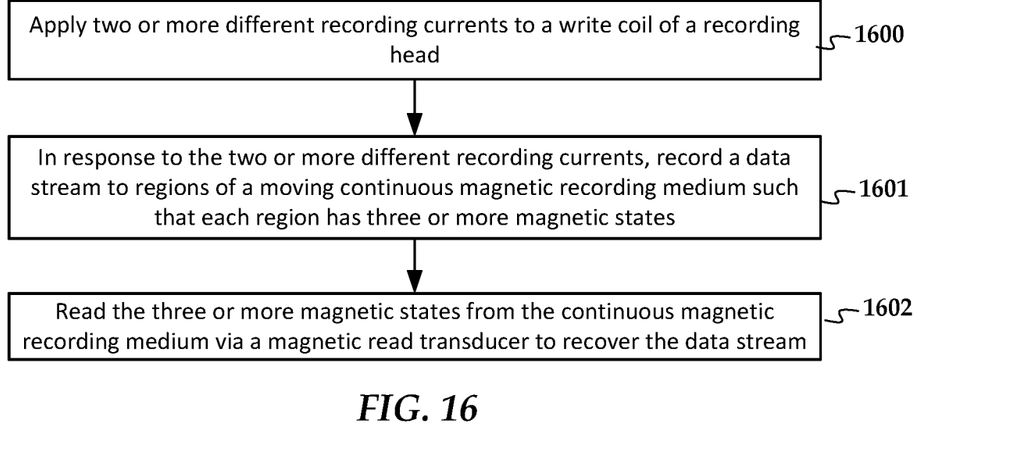
FIGS. 16 and 17 are flowcharts of methods according to example embodiments.

In FIG. 16, a flowchart shows a method according to an example embodiment. The method involves applying 1600 two or more different recording currents to a write coil of a recording head. A first of the two or more currents is a positive current and a second of the two or more currents is a negative current. In response to the two or more different recording currents, a data stream is recorded 1601 to regions of a moving continuous magnetic recording medium such that each region has three or more magnetic states. The three or more magnetic states are read 1602 from the continuous magnetic recording medium via a magnetic read transducer to recover the data stream.

Figure 17:
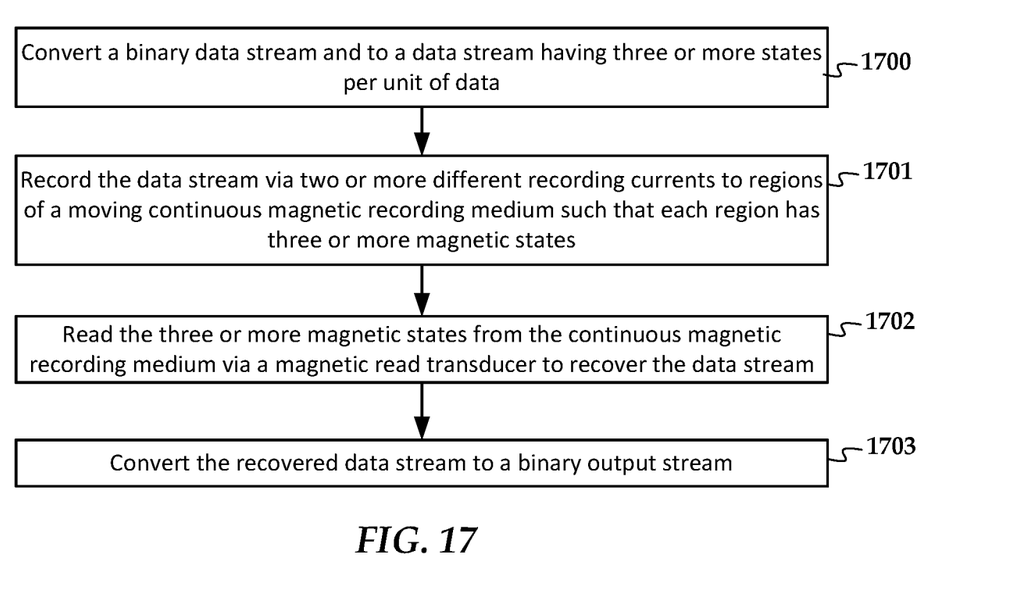

In FIG. 17, a flowchart shows a method according to an example embodiment. The method involves converting 1700 a binary data stream and to a data stream having three or more states per unit of data. The data stream is recorded 1701 via two or more different recording currents to regions of a moving continuous magnetic recording medium such that each region has three or more magnetic states. Each of the magnetic states corresponds to one of the three or more states per unit of data. The three or more magnetic states are read 1702 from the continuous magnetic recording medium via a magnetic read transducer to recover the data stream. The recovered data stream is then converted 1703 to a binary output stream.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
applying two or more different recording currents to a write coil of a recording head, a first of the two or more currents being a positive current and a second of the two or more currents being a negative current, wherein the two or more currents are generated by combining two or more two-level digital signals from two or more preamplifier circuits;
in response to the application of the two or more different recording currents, recording a data stream to regions of a moving continuous magnetic recording medium such that each region has three or more magnetic states; and
reading the three or more magnetic states from the continuous magnetic recording medium via a magnetic read transducer to recover the data stream.

2. The method of claim 1, wherein the two or more currents comprise the negative current, the positive current and a zero or near-zero current.

3. The method of claim 2, the recording of the data stream is assisted by a heat source or a microwave source that neutralizes a magnetic state corresponding to the zero or near-zero current.

4. A method, comprising:
applying three or more different recording currents to a write coil of a recording head, the three or more currents ranging from a maximum positive current to a maximum negative current;
in response to the application of the three or more different recording currents, recording a data stream to regions of a moving continuous magnetic recording medium such that each region has three or more magnetic states, and wherein the three or more currents are unequally spaced within the range to account for a magnetic hysteresis of the continuous magnetic recording medium; and
reading the three or more magnetic states from the continuous magnetic recording medium via a magnetic read transducer to recover the data stream.

5. The method of claim 1, wherein the three or more magnetic states comprise:
a positive maximum field corresponding to a positive maximum current;
a negative maximum field corresponding to a negative maximum current; and
an intermediate field between the positive and negative maximum field.

6. The method of claim 5, wherein the intermediate field is set via an alternating erase current having an erase frequency that is higher than a frequency of the data stream.

7. The method of claim 1, further comprising receiving binary data and converting the binary data to the data stream which has three or more states per unit of data that each correspond to one of the three or more magnetic states.

8. A data storage device comprising:
an interface circuit coupled to the recording head having the write coil and the magnetic read transducer; and
a controller coupled to the interface circuit and configured to perform the method of claim 1.

9. The data storage device of claim 8, wherein the two or more currents comprise the negative current, the positive current and a zero or near-zero current.

10. The data storage device of claim 9, the recording head comprises a heat source or a microwave source that assists in recording to the recording medium, the controller further configured to neutralizes a magnetic state corresponding to the zero or near-zero current via the heat source or the microwave source.

11. The data storage device of claim 8, wherein the two or more different recording currents comprise three or more currents ranging from a maximum positive current to a maximum negative current, and wherein the three or more currents are unequally spaced within the range to account for a magnetic hysteresis of the continuous magnetic recording medium.

12. The data storage device of claim 8, wherein the three or more magnetic states comprise:
a positive maximum field corresponding to a positive maximum current;
a negative maximum field corresponding to a negative maximum current; and
an intermediate field between the positive and negative maximum field.

13. The data storage device of claim 12, wherein the intermediate field is set via an alternating erase current having an erase frequency that is higher than a frequency of the data stream.

14. The data storage device of claim 8, wherein the controller is further configured to receive binary data and converting the binary data to a stream having three or more states per unit of data, the three or more states per unit of data each corresponding to one of the three or more magnetic states.

15. A method comprising:
converting a binary data stream to a data stream having three or more states per unit of data;
recording the data stream via two or more different recording currents to regions of a moving continuous magnetic recording medium such that each region has three or more magnetic states, each of the magnetic states corresponding to one of the three or more states per unit of data, wherein the three or more magnetic states comprise:
a positive maximum field corresponding to a positive maximum current;
a negative maximum field corresponding to a negative maximum current; and
an intermediate field between the positive and negative maximum field, and wherein the intermediate field is set via an alternating erase current having an erase frequency that is higher than a frequency of the data;

reading the three or more magnetic states from the continuous magnetic recording medium via a magnetic read transducer to recover the data stream; and converting the recovered data stream to a binary output stream.

16. The method of claim 15, wherein the two or more different recording currents comprise three or more currents ranging from a maximum positive current to a maximum negative current, and wherein the three or more currents are unequally spaced within the range to account for a magnetic hysteresis of the continuous magnetic recording medium.

17. A data storage device comprising:

an interface circuit coupled to the recording head having the write coil and the magnetic read transducer; and a controller coupled to the interface circuit and configured to perform the method of claim 4.

18. A data storage device comprising:

an interface circuit coupled to a recording head having a write coil and the magnetic read transducer; and a controller coupled to the interface circuit and configured to perform the method of claim 15.

* * * * *